(12) United States Patent
Lim et al.

(10) Patent No.: US 11,522,618 B2
(45) Date of Patent: Dec. 6, 2022

(54) QUANTUM INFORMATION TRANSMITTER, QUANTUM COMMUNICATION SYSTEM INCLUDING THE SAME, AND OPERATING METHOD OF QUANTUM INFORMATION TRANSMITTER

(71) Applicant: Electronics and Telecommunications Research Institute, Daejeon (KR)

(72) Inventors: Kyongchun Lim, Daejeon (KR); Chun Ju Youn, Daejeon (KR); Young-Ho Ko, Daejeon (KR); Kap Joong Kim, Daejeon (KR); Minchul Kim, Incheon (KR); Byung-seok Choi, Sejong-si (KR); Joong-Seon Choe, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 51 days.

(21) Appl. No.: 17/203,186

(22) Filed: Mar. 16, 2021

(65) Prior Publication Data
US 2021/0306077 A1    Sep. 30, 2021

(30) Foreign Application Priority Data
Mar. 26, 2020    (KR) .................. 10-2020-0037086

(51) Int. Cl.
*H04B 10/70*    (2013.01)
*H04L 9/08*    (2006.01)

(52) U.S. Cl.
CPC ........... *H04B 10/70* (2013.01); *H04L 9/0852* (2013.01)

(58) Field of Classification Search
CPC .............................. H04B 10/70; H04L 9/0852
(Continued)

(56) References Cited

U.S. PATENT DOCUMENTS 8,116,636 B2    2/2012  Youn et al.
8,483,572 B2    7/2013  Dynes et al.
(Continued)

FOREIGN PATENT DOCUMENTS

CN        104104502 A   * 10/2014
WO   WO-2019100694 A1 * 5/2019 ........... G02B 27/283

OTHER PUBLICATIONS

Mailloux et al; Modeling, Simulation, and Performance Analysis of Decoy State Enabled Quantum Key Distribution Systems; Feb. 2017; MDPI Applied Sciences; pp. 1-20. (Year: 2017).*
(Continued)

*Primary Examiner* — Amritbir K Sandhu
(74) *Attorney, Agent, or Firm* — Kile Park Reed & Houtteman PLLC

(57) ABSTRACT

Disclosed are a quantum information transmitter, a quantum communication system including the same, and an operating method of the quantum information transmitter. The quantum information transmitter includes a light source driver, a light source, and a light modulator. The light source driver generates a first light source driving signal having a first level and a second light source driving signal having a second level. The light source generates a first light signal having a first average number of photons in response to the first light source driving signal, and generates a second light signal having a second average number of photons in response to the second light source driving signal. The optical modulator modulates the first light signal to generate a target signal, and modulates the second light signal to generate a decoy signal.

17 Claims, 7 Drawing Sheets

(58) Field of Classification Search
USPC .......................................................... 382/256
See application file for complete search history.

(56) References Cited

U.S. PATENT DOCUMENTS

| | | |
|---|---|---|
| 8,639,927 B2 | 1/2014 | Choi et al. |
| 9,819,418 B2 | 11/2017 | Nordholt et al. |
| 2007/0071244 A1 | 3/2007 | LaGasse |
| 2010/0195831 A1 | 8/2010 | Tanaka et al. |
| 2021/0306077 A1* | 9/2021 | Lim ........................ H04B 10/70 |

OTHER PUBLICATIONS

Dixon et al; Quantum key distribution with hacking countermeasures and long term field trial, May 2017; nature.com/scientificreports; pp. 1-9. (Year: 2017).*

Mailloux et al; Modeling, Simulation and Performance Analysis of Decoy State Enabled Quantum key distribution Systems; Feb. 2017; MDPI Applied Sciences; pp. 1-20. (Year: 2010).*

Gaidash et al; Revealing of photon-number splitting attack on quantum key distribution system by photon-number resolving devices; 2016; Journal of Physics; pp. 1-6. (Year: 2016).*

Liu et al; Decoy state quantum key distribution with polarized photons over200Km; Apr. 2010; Optical Society of America; pp. 1-8. (Year: 2010).*

Sheng-Kai Liao et al., "Satellite-to-ground quantum key distribution", Nature, vol. 549, Sep. 7, 2017, 17 pages.

Xiongfeng Ma et al., "Practical decoy state for quantum key distribution", The American Physical Society, Physical Review A 012326, Jul. 20, 2005, pp. 012326-1-012326-15.

* cited by examiner

QUANTUM INFORMATION TRANSMITTER, QUANTUM COMMUNICATION SYSTEM INCLUDING THE SAME, AND OPERATING METHOD OF QUANTUM INFORMATION TRANSMITTER

CROSS-REFERENCE TO RELATED APPLICATIONS

This application claims priority under 35 U.S.C. § 119 to Korean Patent Application No. 10-2020-0037086 filed on Mar. 26, 2020, in the Korean Intellectual Property Office, the disclosures of which are incorporated by reference herein in their entireties.

BACKGROUND

Embodiments of the present disclosure described herein relate to quantum cryptographic communication, and more particularly, relate to a quantum information transmitter, a quantum communication system including the same, and an operating method of the quantum information transmitter.

Optical communication refers to a communication method using light generated from a laser, etc., as a carrier wave. Quantum cryptographic communication refers to a communication method of performing quantum encryption using quantum mechanical properties of light and recording information in a quantum state. The quantum cryptographic communication uses a quantum key distribution (QKD) technology that distributes quantum encryption keys for encoding and decoding information between a transmitter and a receiver. In quantum cryptographic communication, since the quantum state changes when an attacker measures the quantum state for eavesdropping, users may easily detect a presence of the attacker.

Due to limitations of a light source used in the quantum cryptographic communication, it is difficult to implement a single photon state ideal for the quantum key distribution (QKD). When the light source creates a multi-photon state, an attacker may split some of the photons and may discover quantum information. Such the attack may be referred to as a photon number splitting attack (PNS attack). In response to the photon number splitting attack, a method of using a decoy state is proposed. For example, the transmitter may further transmit a decoy signal that has an average photon count different from a target signal including the quantum information. When the photon number splitting attack is performed, changes in the target signal and the decoy signal may be detected. There is a need for a method for efficiently generating such the decoy signal.

SUMMARY

Embodiments of the present disclosure provide a quantum information transmitter that may decrease components for generating a decoy signal and may improve characteristics of the decoy signal, a quantum communication system including the same, and an operating method of the quantum information transmitter.

According to an embodiment of the present disclosure, a quantum information transmitter includes a light source driver, a light source, and a light modulator. The light source driver generates a first light source driving signal having a first level and a second light source driving signal having a second level. The light source generates a first light signal having a first average number of photons in response to the first light source driving signal, and generates a second light signal having a second average number of photons in response to the second light source driving signal. The optical modulator modulates the first light signal to generate a target signal, and modulates the second light signal to generate a decoy signal.

According to an embodiment, the light source driver may include a signal generator and a differential amplifier. The signal generator may generate a first electrical signal corresponding to the first light source driving signal and a second electrical signal corresponding to the second light source driving signal. The differential amplifier may output the first light source driving signal to the light source when the first electrical signal is received through a first input terminal, and may output the second light source driving signal to the light source when the second electrical signal is received through a second input terminal.

According to an embodiment, the first electrical signal may have a level greater than a reference voltage, and the second electrical signal may have a level less than the reference voltage. The differential amplifier may amplify a difference between the first electrical signal and the reference voltage to generate the first light source driving signal, and may amplify a difference between the reference voltage and the second electrical signal to generate the second light source driving signal.

According to an embodiment, the first electrical signal may have a level less than a reference voltage, and the second electrical signal may have a level greater than the reference voltage. The differential amplifier may amplify a difference between the reference voltage and the first electrical signal to generate the first light source driving signal, and may amplify a difference between the second electrical signal and the reference voltage to generate the second light source driving signal.

According to an embodiment, when the first electrical signal is received, the differential amplifier may output the first light source driving signal to the light source through an output terminal, and when the second electrical signal is received, the differential amplifier may output the second light source driving signal to the light source through the output terminal.

According to an embodiment, when a first difference between the first electrical signal and a reference voltage is greater than a second difference between the second electrical signal and the reference voltage, the first average number of photons may be greater than the second average number of photons, and when the first difference is less than the second difference, the first average number of photons may be less than the second average number of photons.

According to an embodiment, a wavelength of the first light signal may be the same as a wavelength of the second light signal.

According to an embodiment, the optical modulator may include an encoder that encodes the first light signal and the second light signal by applying an encryption key to the first light signal and the second light signal, respectively, and an attenuator that generates the target signal by reducing an intensity of the encoded first light signal and generates the decoy signal by reducing an intensity of the encoded second light signal.

According to an embodiment, when the first level is greater than the second level, the first average number of photons may be greater than the second average number of photons, an average number of photons of the target signal may be less than the first average number of photons, and an average number of photons of the decoy signal may be less than the average number of photons of the target signal and the second average number of photons, and when the first level is less than the second level, the first average number of photons may be less than the second average number of photons, the average number of photons of the decoy signal may be less than the second average number of photons, and the average number of photons of the target signal may be less than the average number of photons of the decoy signal and the first average number of photons.

According to an embodiment, the light source driver may include a first signal generator that generates a first electrical signal corresponding to the first light source driving signal and outputs the first electrical signal to its first and second output lines, a second signal generator that generates a second electrical signal corresponding to the second light source driving signal and outputs the second electrical signal to its first and second output lines, a differential amplifier that amplifies the first electrical signal received through its first and second input terminals to generate the first light source driving signal and amplifies the second electrical signal received through its first and second input terminals to generate the second light source driving signal, and a combiner that electrically connects the first and second output lines of the first signal generator to the first and second input terminals of the differential amplifier, respectively, when the first electrical signal is received, and electrically connects the first and second output lines of the second signal generator to the first and second input terminals of the differential amplifier, respectively, when the second electrical signal is received.

According to an embodiment, the light source driver may include a first signal generator that generates a first electrical signal corresponding to the first light source driving signal and outputs the first electrical signal to its first and second output lines, a second signal generator that generates a second electrical signal corresponding to the second light source driving signal and outputs the second electrical signal to its first and second output lines, a first differential amplifier that amplifies the first electrical signal received through the first and second output lines of the first signal generator to generate the first light source driving signal, a second differential amplifier that amplifies the second electrical signal received through the first and second output lines of the second signal generator to generate the second light source driving signal, and a combiner that transfers the first light source driving signal and the second light source driving signal to the light source.

According to an embodiment of the present disclosure, a quantum communication system includes a quantum information transmitter and a quantum information receiver. The quantum information transmitter includes a light source that generates a first light signal having a first average number of photons and a second light signal having a second average number of photons different from the first average number of photons, and an optical modulator that generates a target signal, based on the first light signal and generates a decoy signal, based on the second light signal. The quantum information receiver receives the target signal and the decoy signal from the quantum information transmitter through a quantum channel.

According to an embodiment, the quantum information transmitter may further include a light source driver that outputs a first light source driving signal having a first level to the light source and outputs a second light source driving signal having a second level different from the first level to the light source. The light source may generate the first light signal, based on the first level of the first light source driving signal, and may generate the second light signal, based on the second level of the second light source driving signal.

According to an embodiment, the light source driver may include a signal generator that generates a first electrical signal and a second electrical signal having a level different from the first electrical signal, and a differential amplifier that generates the first light source driving signal, based on a difference between the first electrical signal and a reference voltage, and generates the second light source driving signal, based on a difference between the second electrical signal and the reference voltage. The signal generator may output the first electrical signal to a first input terminal of the differential amplifier, and may output the second electrical signal to a second input terminal of the differential amplifier.

According to an embodiment, the decoy signal may include a first decoy having an average number of photons greater than '0', and a second decoy having an average number of photons of '0', and the light source may generate the second light signal corresponding to the first decoy when the second level is greater than a reference voltage, and may generate the second light signal corresponding to the second decoy when the second level is the reference voltage.

According to an embodiment, the optical modulator may generate the target signal having a third average number of photons less than the first average number of photons by reducing an intensity of the first light signal, and may generate the decoy signal having a fourth average number of photons that is less than the second average number of photons and different from the third average number of photons by reducing an intensity of the second light signal. The optical modulator may reduce the intensity of the first light signal and the intensity of the second light signal under the same attenuation condition.

According to an embodiment, the quantum information receiver may determine a photon number splitting attack, based on an average number of photons of the received target signal and an average number of photons of the received decoy signal.

According to an embodiment of the present disclosure, an operating method of a quantum information transmitter includes outputting a first electrical signal to a first input terminal of a differential amplifier, outputting a second electrical signal to a second input terminal of the differential amplifier, generating a first light source driving signal having a first level by amplifying a difference between the first electrical signal and a reference voltage, generating a second light source driving signal having a second level by amplifying a difference between the second electrical signal and the reference voltage, generating a first light signal, based on the first light source driving signal, generating a second light signal having an average number of photons different from that of the first light signal, based on the second light source driving signal, generating a target signal by modulating the first light signal, and generating a decoy signal having an average number of photons different from that of the target signal by modulating the second light signal.

According to an embodiment, the first electrical signal may have a voltage level greater than the reference voltage, and the second electrical signal may have a voltage level less than the reference voltage.

According to an embodiment, the first electrical signal may have a voltage level less than the reference voltage, and the second electrical signal may have a voltage level greater than the reference voltage.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure.

Figure 1:
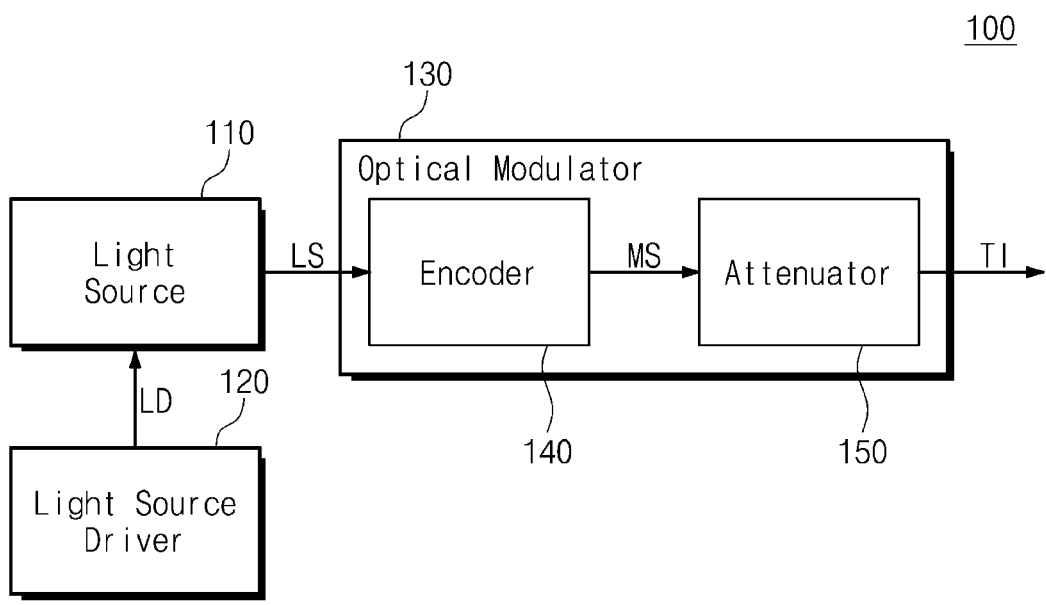
FIG. 1 is a block diagram illustrating a quantum information transmitter according to an embodiment of the present disclosure.

FIG. 1 is a block diagram illustrating a quantum information transmitter according to an embodiment of the present disclosure. Referring to FIG. 1, a quantum information transmitter 100 includes a light source 110, a light source driver 120, and an optical modulator 130. The quantum information transmitter 100 according to an embodiment of the present disclosure may be included in a quantum communication system for implementing a quantum key distribution (QKD) that shares encryption key information using quantum information. For example, the quantum information transmitter 100 may implement the QKD using a BB84 protocol, etc.

In theory, when the quantum information transmitter 100 transmits quantum information using a single photon state, stable quantum cryptographic communication is possible. This is because in the single photon state, when an attacker intercepts a photon, quantum information is not transmitted to a quantum information receiver. Thus, the attacker should resend the photon after getting its quantum information. This necessarily alters the quantum information of the intercepted photon by nature of quantum physics. As a result, the attack may be easily determined. However, due to technical limitations of the light source 110, it is difficult for the quantum information transmitter 100 to transmit the quantum information using the single photon. The light source 110 generates a multi-photon state, and an attacker may perform a photon number splitting attack that intercepts some of the photons. To secure stability against such an attack, the quantum information transmitter 100 may transmit a decoy signal together with a target signal to be transmitted to the quantum information receiver (not illustrated) through a quantum channel.

In the following, the target signal will be understood as a signal for transferring quantum information such as encryption key information in quantum cryptographic communication. The decoy signal will be understood as a signal to detect the photon number splitting attack by an attacker. The target signal and the decoy signal have different average number of photons. For example, the target signal may have an average number of photons per pulse of 0.5, and the decoy signal may have an average number of photons per pulse of 0.1.

The light source 110 may output a light signal LS. For example, the light source 110 may be a laser. The light source 110 may output the light signal LS, based on a light source driving signal LD provided from the light source driver 120. An intensity of the light signal LS depends on a level of the light source driving signal LD. The intensity of the light signal LS may represent an average number of photons per optical pulse.

In reality, the light source 110 outputs the light signal LS having the multi-photon state. Accordingly, the light source 110 may output the light signal LS corresponding to the target signal and the light signal LS corresponding to the decoy signal. Conventionally, a light source for generating the target signal and a light source for generating the decoy signal are distinguished. Alternatively, the light source generates the light signal of a specific intensity, and then the target signal and the decoy signal are distinguished and output by performing post-processing of the light signal through a light intensity modulation, etc. However, such a conventional method requires an additional light source or additional components for the light intensity modulation, etc.

Since the light source 110 according to an embodiment of the present disclosure may adjust the intensity of the light signal LS, based on the light source driving signal LD, the quantum information transmitter 100 may not require separate components. Accordingly, the quantum information transmitter 100 may generate the target signal and the decoy signal with simplified components. In addition, it is preferable that physical characteristics (e.g., wavelength, time, etc.) of the target signal and the decoy signal match each other except for the average number of photons, such that an attacker may not distinguish between the target signal and the decoy signal. Since the light source 110 according to an embodiment of the present disclosure generates the light signal LS from one source, physical characteristics excluding the average number of photons may be easily matched. Accordingly, a quality of the decoy signal may be improved and security may be improved.

The light source driver 120 may control driving of the light source 110 such that the light source 110 outputs the light signal LS. The light source driver 120 may generate the light source driving signal LD. The light source 110 may output the light signal LS in response to the light source driving signal LD. The light source driver 120 may distinguish and output the light source driving signal LD corresponding to the target signal and the light source driving signal LD corresponding to the decoy signal. An electric level of the light source driving signal LD corresponding to the target signal may be different from an electric level of the light source driving signal LD corresponding to the decoy signal. The light source 110 may generate the light signal LS having the intensity depending on the electrical level of the light source driving signal LD. Details of the light source driver 120 will be described later.

The optical modulator 130 modulates the light signal LS output from the light source 110 to generate transmission information TI. This transmission information TI includes the above-described target signal and the above-described decoy signal. The transmission information TI may be transmitted to the quantum information receiver (not illustrated) through the quantum channel. For example, the optical modulator 130 may include an encoder 140 and an attenuator 150. Whether a signal is the target signal or the decoy signal is determined by the intensity of the light signal LS output from the light source 110. The encoder 140 and the attenuator 150 may not process the light signal LS by distinguishing the target signal and the decoy signal, but may process the light signal LS, based on the same processing criteria.

The encoder 140 may encode the light signal LS by applying an encryption key to the light signal LS output from the light source 110. For example, the encoder 140 may polarize each of pulses of the light signal LS at one of a plurality of preset polarization angles. For example, the encoder 140 may modulate a phase of each of the pulses of the light signal LS into one of a plurality of preset phases. The encoder 140 may generate an encoded light signal MS including the encryption key by encoding the light signal LS.

The attenuator 150 may generate the transmission information TI by reducing the intensity of the encoded light signal MS. The attenuator 150 may generate the transmission information TI having a low intensity required in the quantum cryptographic communication. For example, the attenuator 150 may attenuate the transmission information TI such that the average number of photons per pulse of the transmission information TI is less than a reference value (e.g., '1'). As the intensity of the transmission information TI decreases, a detection efficiency of an attacker's photon number splitting attack may increase. However, a photon number distribution may represent a Poisson distribution. Based on this distribution, the transmission information TI having the multi-photon state may exist even though the average number of photons of the transmission information TI is decreased. The quantum information transmitter 100 may prepare for the photon number splitting attack against multiple photons by outputting the transmission information TI including the target signal and the decoy signal.

Figure 2:
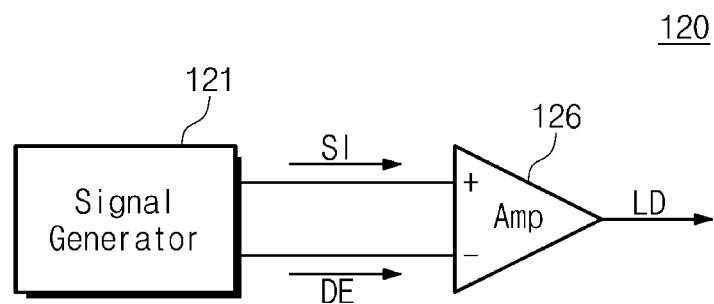
FIG. 2 is a diagram illustrating a light source driver of FIG. 1.

FIG. 2 is a diagram illustrating a light source driver of FIG. 1. The light source driver 120 of FIG. 2 will be understood as a configuration for generating the light source driving signal LD for generating the light signal LS of the light source 110. The light source driver 120 may generate the light source driving signal LD corresponding to the target signal and the light source driving signal LD corresponding to the decoy signal. To this end, the light source driver 120 may include a signal generator 121 and a differential amplifier 126.

The signal generator 121 may generate a first electrical signal SI corresponding to the target signal and a second electrical signal DE corresponding to the decoy signal. The signal generator 121 may randomly generate pulses of the first electrical signal SI and the second electrical signal DE such that only one of the pulses are generated at a given time. A level of the first electrical signal SI may be different from a level of the second electrical signal DE. This is to allow the light source 110 of FIG. 1 to distinguish and output the light signal LS corresponding to the target signal and the light signal LS corresponding to the decoy signal.

The differential amplifier 126 may amplify a difference between the first electrical signal SI and a reference voltage or a difference between the second electrical signal DE and the reference voltage to generate the light source driving signal LD. In this case, the reference voltage may be, is not limited thereto, the same as a ground voltage. The differential amplifier 126 includes a first input terminal and a second input terminal. The differential amplifier 126 may receive the first electrical signal SI through the first input terminal. The differential amplifier 126 may receive the second electrical signal DE through the second input terminal. In detail, the input terminal that receives the first electrical signal SI and the input terminal that receives the second electrical signal DE in the differential amplifier 126 may be different from each other. As an example, the first input terminal may be a positive input terminal, and the second input terminal may be a negative input terminal.

The differential amplifier 126 may amplify the difference between the first electrical signal SI and the reference voltage to generate the light source driving signal LD corresponding to the target signal. To this end, the signal generator 121 may output the first electrical signal SI to the first input terminal of the differential amplifier 126. The light source driving signal LD corresponding to the target signal may be output to the light source 110 of FIG. 1 through an output terminal of the differential amplifier 126.

The differential amplifier 126 may amplify the difference between the reference voltage and the second electrical signal DE to generate the light source driving signal LD corresponding to the decoy signal. To this end, the signal generator 121 may output the second electrical signal DE to the second input terminal of the differential amplifier 126. The light source driving signal LD corresponding to the decoy signal may be output to the light source 110 of FIG. 1 through the output terminal of the differential amplifier 126. The differential amplifier 126 may output the light source driving signal LD corresponding to the target signal or the decoy signal through one output terminal.

Figure 3:
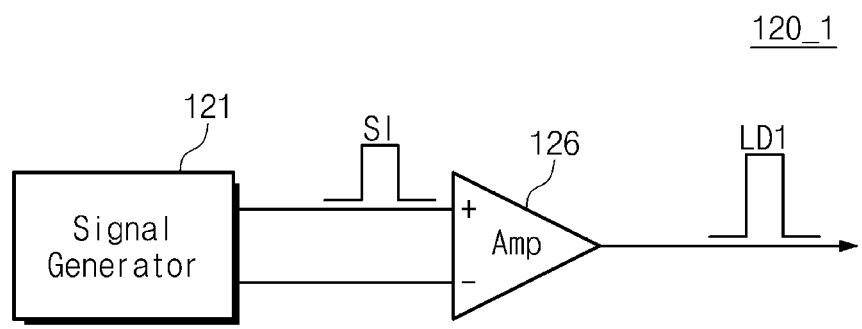
FIG. 3 is a diagram describing an operation in which a light source driver of FIG. 2 generates a light source driving signal corresponding to a target signal.
Figure 4:
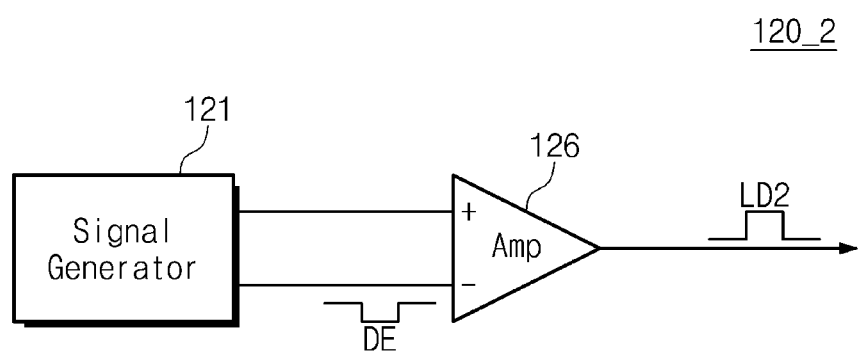
FIG. 4 is a diagram describing an operation in which a light source driver of FIG. 2 generates a light source driving signal corresponding to a decoy signal.

FIG. 3 is a diagram describing an operation in which a light source driver of FIG. 2 generates a light source driving signal corresponding to a target signal. FIG. 4 is a diagram describing an operation in which a light source driver of FIG. 2 generates a light source driving signal corresponding to a decoy signal.

Referring to FIG. 3, a light source driver 120_1 includes the signal generator 121 and the differential amplifier 126, and the light source driver 120_1 corresponds to the light source driver 120 of FIGS. 1 and 2. The signal generator 121 may output the first electrical signal SI to a first input terminal of the differential amplifier 126. The first electrical signal SI may have a voltage level greater than the reference voltage (e.g., ground voltage). The differential amplifier 126 may amplify the difference between the first electrical signal SI and the reference voltage to generate a first light source driving signal LD1.

Referring to FIG. 4, a light source driver 120_2 includes the signal generator 121 and the differential amplifier 126, and the light source driver 120_2 corresponds to the light source driver 120 of FIGS. 1 and 2. The signal generator 121 may output the second electrical signal DE to the second input terminal of the differential amplifier 126. The second electrical signal DE may have a voltage level less than the reference voltage (e.g., ground voltage). The differential amplifier 126 may generate a second light source driving signal LD2 by amplifying the difference between the reference voltage and the second electrical signal DE. The second light source driving signal LD2 may have a polarity different from that of the second electrical signal DE.

Referring to FIGS. 3 and 4, a polarity of the first electrical signal SI may be different from a polarity of the second electrical signal DE. This is to ensure that the first light source driving signal LD1 and the second light source driving signal LD2 have the same polarity. Since the first electrical signal SI is input to the positive input terminal of the differential amplifier 126 and the second electrical signal DE is input to the negative input terminal of the differential amplifier 126, a polarity of the first light source driving signal LD1 may be the same as a polarity of the second light source driving signal LD2.

An absolute value of the voltage level of the first electrical signal SI may be different from that of the voltage level of the second electrical signal DE. As a result, the first light source driving signal LD1 may have a voltage level different from that of the second light source driving signal LD2. For example, the absolute value of the voltage level of the first electrical signal SI may be greater than the absolute value of the voltage level of the second electrical signal DE. In this case, the voltage level of the first light source driving signal LD1 may be greater than the voltage level of the second light source driving signal LD2. However, the present disclosure is not limited thereto, and the absolute value of the voltage level of the first electrical signal SI may be less than the absolute value of the second electrical signal DE. Accordingly, the light source 110 of FIG. 1 may output the light signal LS such that the target signal and the decoy signal have different average photons. As a result, the intensity of the target signal and the intensity of the decoy signal may be different from each other.

Furthermore, the signal generator 121 may not output the second electrical signal DE to the second input terminal of the differential amplifier 126 during at least some of times during which the electrical signal corresponding to the decoy signal is generated. As an example, the signal generator 121 may output the second electrical signal DE during a first time among times for generating the decoy signal, and may output the reference voltage during a second time different from the first time among times for generating the decoy signal. In this case, the light source driver 120_2 may output the second light source driving signal LD2 to the light source 110 of FIG. 1 during the first time, and may not output a light source driving signal to the light source 110 during the second time. The light source 110 may generate a first decoy signal having the average number of photons different from that of the target signal, based on the second light source driving signal LD2 output during the first time. As the light source 110 does not receive the light source driving signal during the second time, the light source 110 may generate a state, in which the average number of photons is '0', as a second decoy signal. In this case, a presence of the second decoy signal may be known to the quantum information receiver (not illustrated) through a public channel (not illustrated) different from the quantum channel.

Figure 5:
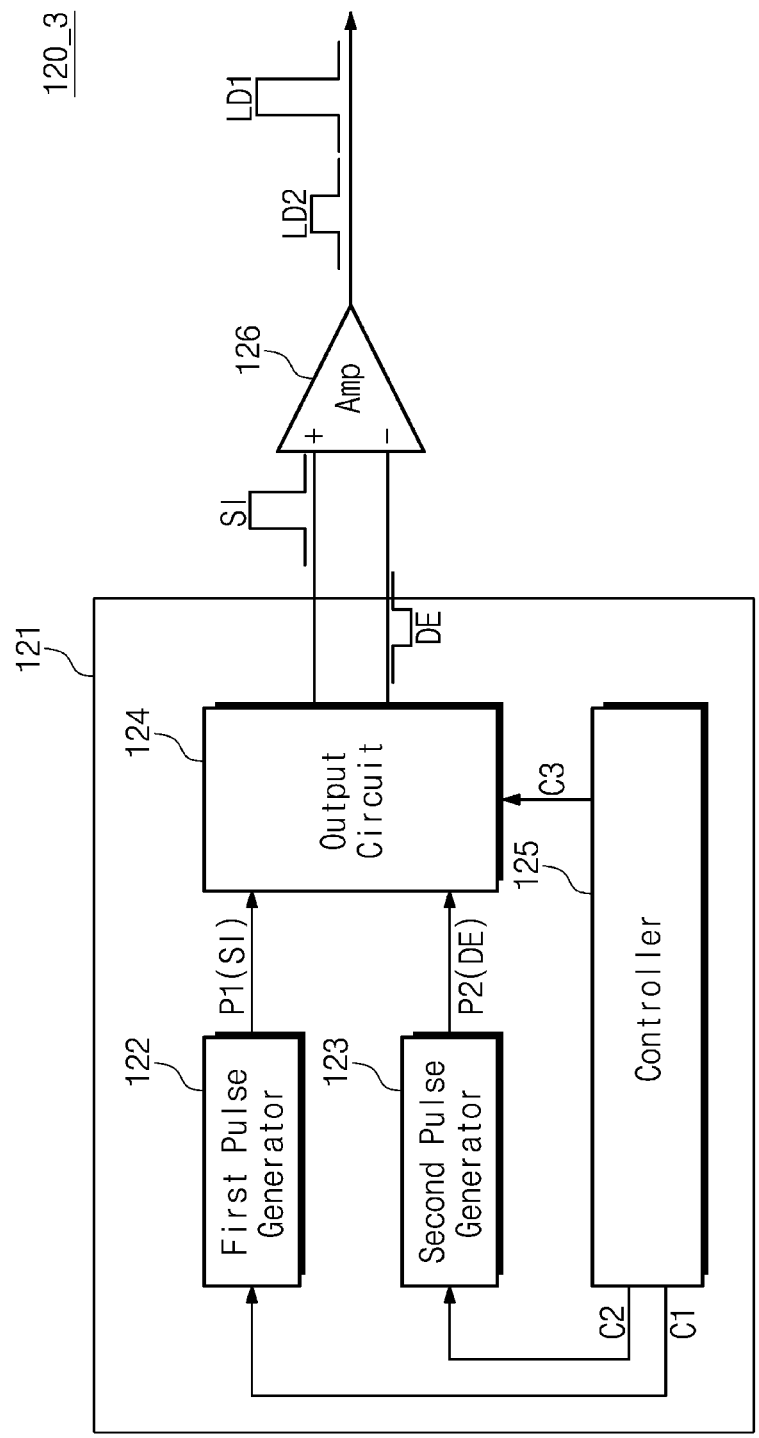
FIG. 5 is a diagram illustrating a light source driver of FIG. 2 in more detail.

FIG. 5 is a diagram illustrating a light source driver of FIG. 2 in more detail. Referring to FIG. 5, a light source driver 120_3 includes the signal generator 121 and the differential amplifier 126. The signal generator 121 and the differential amplifier 126 correspond to the signal generator 121 and the differential amplifier 126 of FIG. 2, respectively. The signal generator 121 may include a first pulse generator 122, a second pulse generator 123, an output circuit 124, and a controller 125. The configuration of the signal generator 121 is an example, and the signal generator 121 of FIG. 2 is not limited to FIG. 5. For example, unlike FIG. 5, one pulse generator may generate the first electrical signal SI and the second electrical signal DE that have different levels under a control of the controller 125.

The first pulse generator 122 may generate a pulse (first pulse, P1) of the first electrical signal SI. The first pulse generator 122 may generate the first pulse P1 under the control of the controller 125. As described above, the first pulse P1 may have a positive level greater than the reference voltage.

The second pulse generator 123 may generate a pulse (second pulse, P2) of the second electrical signal DE. The second pulse generator 123 may generate the second pulse P2 under the control of the controller 125. Under the control of the controller 125, the first pulse P1 and the second pulse P2 may be provided to the output circuit 124 at different times. As described above, the second pulse P2 may have a negative level less than the reference voltage. As described above, an absolute value of the first pulse P1 and an absolute value of the second pulse P2 may be different from each other. In addition, as described above, the second pulse generator 123 may not output the second pulse P2 during some of the times for generating the decoy signal to generate the decoy signal having the average number of photons of '0'.

The output circuit 124 may receive the first electrical signal SI and the second electrical signal DE, and may output the first electrical signal SI and the second electrical signal DE to the differential amplifier 126. The output circuit 124 may output the first electrical signal SI to the first input terminal of the differential amplifier 126 under the control of the controller 125. The output circuit 124 may output the second electrical signal DE to the second input terminal of the differential amplifier 126 under the control of the controller 125. In detail, the output circuit 124 may control an output path of the first electrical signal SI and the second electrical signal DE such that the first electrical signal SI and the second electrical signal DE are output to different input terminals of the differential amplifier 126.

The controller 125 may control an operation of the first pulse generator 122, the second pulse generator 123, and the output circuit 124. To this end, the controller 125 may be generate a first control signal C1 for generating the first pulse P1 of the first pulse generator 122, a second control signal C2 for generating the second pulse P2 of the second pulse generator 123, and a third control signal C3 for controlling the output path of the output circuit 124.

For example, each of the first pulse generator 122 and the second pulse generator 123 may output the first pulse P1 in response to the first control signal C1 and the second pulse P2 in response to the second control signal C2. The controller 125 may control a generation timing of the first pulse P1 and the second pulse P2 such that the first pulse P1 and the second pulse P2 are generated at different times. When the first pulse P1 is generated, the controller 125 may generate the third control signal C3 such that the corresponding pulse is output to the first input terminal of the differential amplifier 126. When the second pulse P2 is generated, the controller 125 may generate the third control signal C3 such that the corresponding pulse is output to the second input terminal of the differential amplifier 126.

The differential amplifier 126 may generate the first light source driving signal LD1 by amplifying the difference between the first electrical signal SI and the reference voltage, as described above. As described above, the differential amplifier 126 may amplify the difference between the reference voltage and the second electrical signal DE to generate the second light source driving signal LD2.

Figure 6:
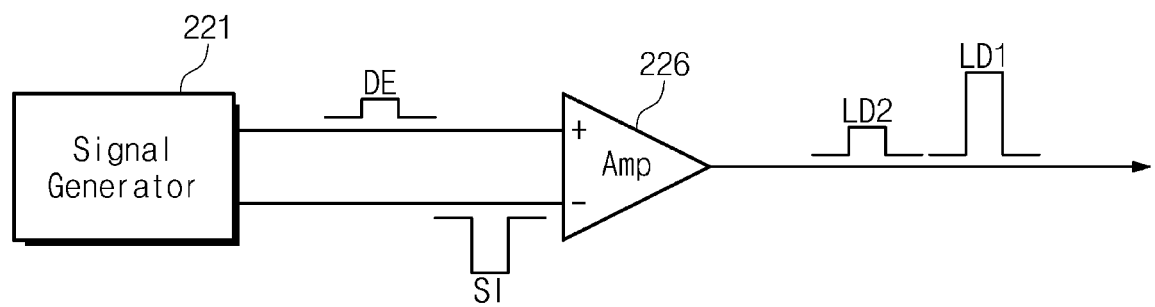
FIG. 6 is a diagram illustrating a light source driver of FIG. 1.

FIG. 6 is a diagram illustrating a light source driver of FIG. 1. A light source driver 220 of FIG. 6 corresponds to the light source driver 120 of FIG. 1. The light source driver 220 may include a signal generator 221 and a differential amplifier 226.

The signal generator 221 may generate the first electrical signal SI corresponding to the target signal and the second electrical signal DE corresponding to the decoy signal. The level of the first electrical signal SI and the level of the second electrical signal DE may be different from each other. Unlike FIGS. 2 to 5, the signal generator 221 may output the first electrical signal SI to the second input terminal (negative input terminal) of the differential amplifier 226, and may output the second electrical signal DE to the first input terminal (positive input terminal) of the differential amplifier 226. Unlike FIGS. 2 to 5, the first electrical signal SI may have a voltage level less than the reference voltage (ground voltage), and the second electrical signal DE may have a voltage level greater than the reference voltage. The configuration of the signal generator 221 may be the same as described with reference to FIGS. 1 to 5 except for paths for outputting the first electrical signal SI and the second electrical signal DE.

The differential amplifier 226 may amplify the difference between the reference voltage and the first electrical signal SI to generate the first light source driving signal LD1 corresponding to the target signal. As a result of the first electrical signal SI being input to the second input terminal, the differential amplifier 226 may output the first light source driving signal LD1 having a level greater than the reference voltage through the output terminal.

The differential amplifier 226 may amplify the difference between the second electrical signal DE and the reference voltage to generate the second light source driving signal LD2 corresponding to the decoy signal. As a result of the second electrical signal DE being input to the first input terminal, the differential amplifier 226 may output the second light source driving signal LD2 having a level greater than the reference voltage through the output terminal. The first light source driving signal LD1 has a voltage level different from that of the second light source driving signal LD2.

Figure 7:
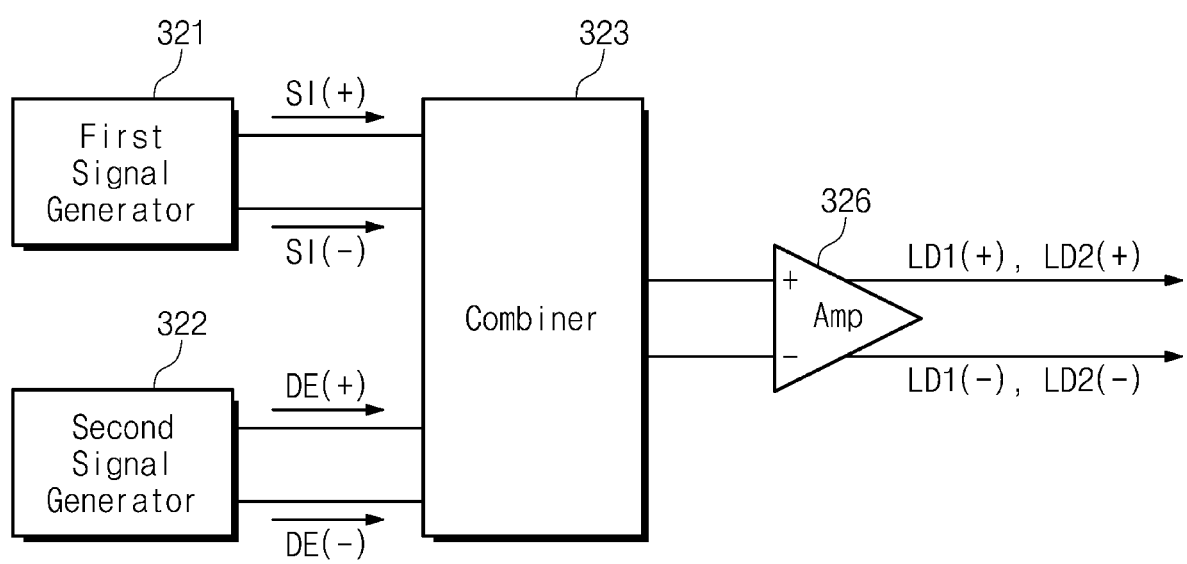
FIG. 7 is a diagram illustrating a light source driver of FIG. 1.

FIG. 7 is a diagram illustrating a light source driver of FIG. 1. A light source driver 320 of FIG. 7 corresponds to the light source driver 120 of FIG. 1. The light source driver 320 may include a first signal generator 321, a second signal generator 322, a combiner 323, and a differential amplifier 326.

The first signal generator 321 may generate the first electrical signal SI corresponding to the target signal. Unlike the above-described signal generators 121 and 221, the first signal generator 321 may output the first electrical signal SI to the combiner 323 by using a potential difference between the two output lines. The first electrical signal SI is the potential difference between a voltage signal SI (+) output to the first output line and a voltage signal SI (−) output to the second output line, and may be provided to the combiner 323.

The second signal generator 322 may generate the second electrical signal DE corresponding to the decoy signal. The second signal generator 322 may output the second electrical signal DE to the combiner 323 by using a potential difference between the two output lines. The second electrical signal DE is the potential difference between a voltage signal DE (+) output to the first output line and a voltage signal DE (−) output to the second output line, and may be provided to the combiner 323. Furthermore, as described above, the second signal generator 322 may not output the second electrical signal DE during some of the times for generating the decoy signal to generate the decoy signal having the average number of photons of '0'.

The combiner 323 may receive the first electrical signal SI and the second electrical signal DE, and may output the first electrical signal SI and the second electrical signal DE to the differential amplifier 126. The first electrical signal SI and the second electrical signal DE may be provided to the combiner 323 at different times. When the first electrical signal SI is received, the combiner 323 may electrically connect the first and second output lines of the first signal generator 321 and first and second input terminals of the differential amplifier 326, respectively. When the second electrical signal DE is received, the combiner 323 may electrically connect the first and second output lines of the second signal generator 322 and first and second input terminals of the differential amplifier 326, respectively.

When the first electrical signal SI is received, the combiner 323 may output the voltage signal SI (+) through the first output line of the first signal generator 321 to the first input terminal of the differential amplifier 326, and may output the voltage signal SI (−) through the second output line of the first signal generator 321 to the second input terminal of the differential amplifier 326. When the second electrical signal DE is received, the combiner 323 may output the voltage signal DE (+) through the first output line of the second signal generator 322 to the first input terminal of the differential amplifier 326, and may output the voltage signal DE (−) through the second output line of the second signal generator 322 to the second input terminal of the differential amplifier 326. However, the present disclosure is not limited thereto, and depending on the polarity of the first electrical signal SI and the second electrical signal DE, the voltage signal through the first output line of the first signal generator 321 or the second signal generator 322 may be output to the second input terminal of the differential amplifier 326, and the voltage signal through the second output line of the first signal generator 321 or the second signal generator 322 may be output to the first input terminal of the differential amplifier 326.

The differential amplifier 326 may amplify the difference between the first electrical signal SI and the reference voltage to generate the first light source driving signal LD1. The differential amplifier 326 may amplify the difference between the second electrical signal DE and the reference voltage to generate the second light source driving signal LD2. The differential amplifier 326 may output first light source driving signals LD1 (+) and LD1 (−) or second light source driving signals LD2 (+) and LD2 (−) to the light source 110 of FIG. 1 by using the potential difference between the two output lines.

Figure 8:
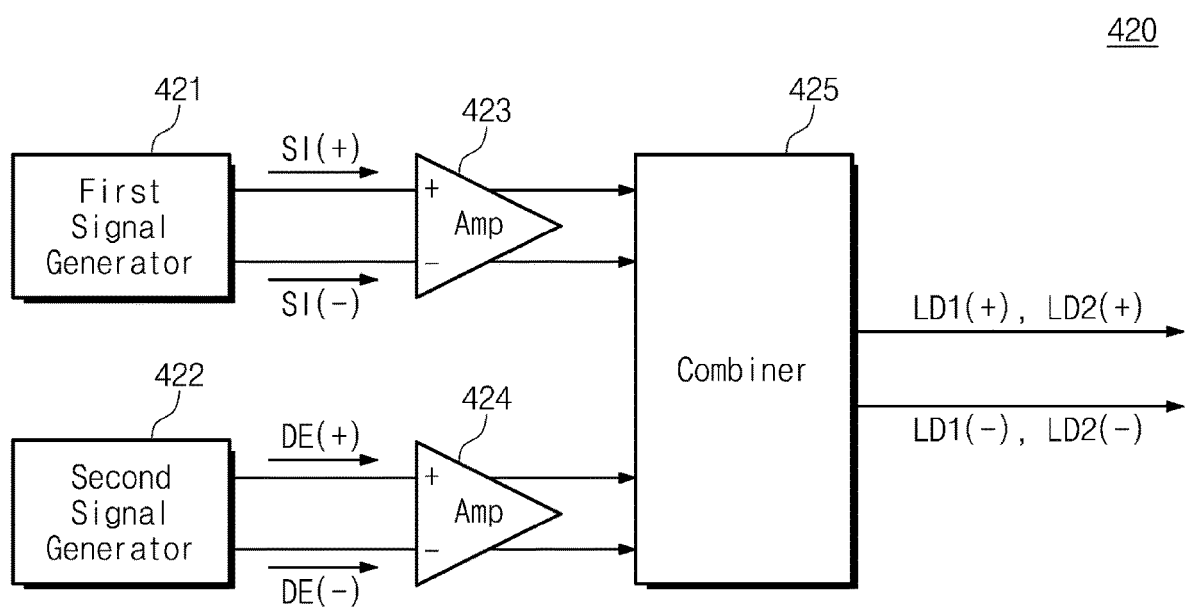
FIG. 8 is a diagram illustrating a light source driver of FIG. 1.

FIG. 8 is a diagram illustrating a light source driver of FIG. 1. A light source driver 420 of FIG. 8 corresponds to the light source driver 120 of FIG. 1. The light source driver 420 may include a first signal generator 421, a second signal generator 422, a first differential amplifier 423, a second differential amplifier 424, and a combiner 425.

The first signal generator 421 may generate the first electrical signal SI corresponding to the target signal. The first signal generator 421 may output the first voltage signals SI (+) and SI (−) to the first differential amplifier 423 by using the potential difference between the two output lines. The second signal generator 422 may generate the second electrical signal DE corresponding to the decoy signal. The second signal generator 422 may output the second electrical signal DE to the second differential amplifier 424 by using the potential difference between the two output lines. In addition, as described above, the second signal generator 422 may not output the second electrical signal DE during some of the times for generating the decoy signal to generate the decoy signal having the average number of photons of '0'.

The first differential amplifier 423 may amplify the first voltage signals SI (+) and SI (−) provided through the two output lines. The second differential amplifier 424 may amplify the second voltage signals DE (+) and DE (−) provided through the two output lines. The first differential amplifier 423 and the second differential amplifier 424 may output the amplified electric signal (e.g., the first light source driving signals LD1 (+) and LD1(−) or the second light source driving signals LD2 (+) and LD2 (−)) to the combiner 425 by using the potential difference between the two output lines.

The combiner 425 may receive the amplified electrical signal from the first differential amplifier 423 or the second differential amplifier 424, and may output the first light source driving signal LD1 or the second light source driving signal LD2 to the light source 110 of FIG. 1. The electrical signal amplified from the first differential amplifier 423 and the electrical signal amplified from the second differential amplifier 424 may be provided to the combiner 425 at different times. The combiner 425 may output the first light source driving signals LD1 (+) and LD1 (−) or the second light source driving signals LD2 (+) and LD2 (−) to the light source 110 of FIG. 1 by using the potential difference between the two output lines.

Figure 9:
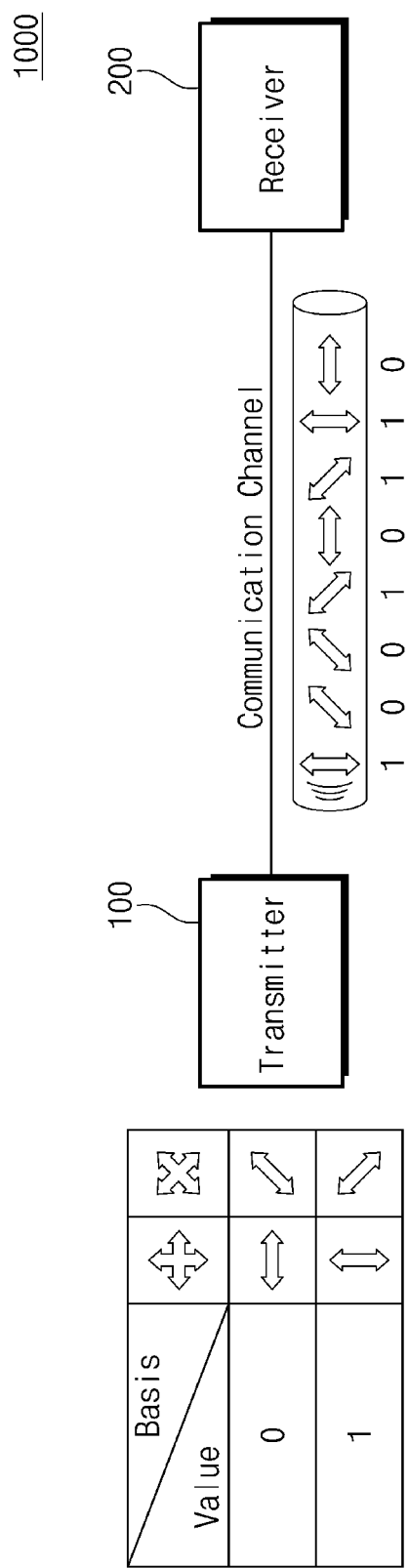
FIG. 9 is a diagram describing a quantum communication system including a quantum information transmitter of FIG. 1.

FIG. 9 is a diagram describing a quantum communication system including a quantum information transmitter of FIG. 1. Referring to FIG. 9, a quantum communication system 1000 includes the transmitter 100 and a receiver 200. The transmitter 100 will be understood as the quantum information transmitter 100 described through FIGS. 1 to 8. The transmitter 100 and the receiver 200 may communicate with each other through a communication channel (quantum channel).

The transmitter 100 transfers the transmission information (TI in FIG. 1) to the receiver 200 through the communication channel. For example, the transmitter 100 may generate transmission information, based on four polarization lights forming two bases. A first basis may be divided into '0' degree polarized light and '90' degree polarized light, and a second basis may be divided into '45' degree polarized light and '−45' degree polarized light. In the transmission information, the '0' degree polarization component may correspond to a bit value of '0' depending on the first basis, and the '90' degree polarization component may correspond to a bit value of '1' depending on the first basis. In addition, the '45' degree polarization component may correspond to the bit value of '0' depending on the second basis, and the '−45' degree polarization component may correspond to the bit value of '1' depending on the second basis. The transmitter 100 may output the transmission information TI having one polarization component among various polarization components through the optical modulator 130 of FIG. 1.

The transmission information TI includes the target signal and the decoy signal. The average number of photons of the target signal may be different from the average number of photons of the decoy signal. As described above, the light source 110 of the transmitter 100 may generate the light signal LS corresponding to the target signal and the light signal LS corresponding to the decoy signal, based on the level of the light source driving signal LD of the light source driver 120. As the intensity of the light signal LS is decreased through the attenuator 150, the average number of photons of the transmission information TI may be less than '1'. For example, the average number of photons of the target signal may be '0.5', and the average number of photons of the decoy signal may be '0.1'. However, the present disclosure is not limited thereto, and the average number of photons of the target signal may be less than the average number of photons of the decoy signal. Furthermore, the decoy signal may include a first decoy having the average number of photons different from that of the target signal and a second decoy having the average number of photons of '0'.

The receiver 200 receives the light signal transferred through the communication channel. The receiver 200 may analyze the transmission information TI, based on the first basis and the second basis. As an example, the transmitter 100 and the receiver 200 may open the basis used in the transmitter 100 and the basis used in the receiver 200, through the public channel (not illustrated) different from the communication channel of the transmission information TI. The transmitter 100 and the receiver 200 may compare the basis for each other. The receiver 200 may select the transmission information TI that is interpreted by the same basis used by the transmitter 100 and the receiver 200. In addition, the transmitter 100 and the receiver 200 may share information for identifying the decoy signal and the target signal through the public channel (not illustrated). For example, when the decoy signal includes the first decoy having the average number of photons greater than '0' and the second decoy having the average number of photons of '0', the transmitter 100 and the receiver 200 may share information for identifying the first decoy and the second decoy.

Depending on the target signal and the decoy signal received through the communication channel, the receiver 200 may determine whether an attacker make the photon number splitting attack. When the photon number splitting attack occurs through the communication channel, a ratio of the average number of photons of the received target signal to the average number of photons of the received decoy signal may be different from a ratio of the average number of photons of the transmitted target signal to the average number of photons of the transmitted decoy signal. In detail, a detection distribution of the multi-photon state of the transmission information TI changes. The receiver 200 may detect the photon number splitting attack through this change.

Figure 10:
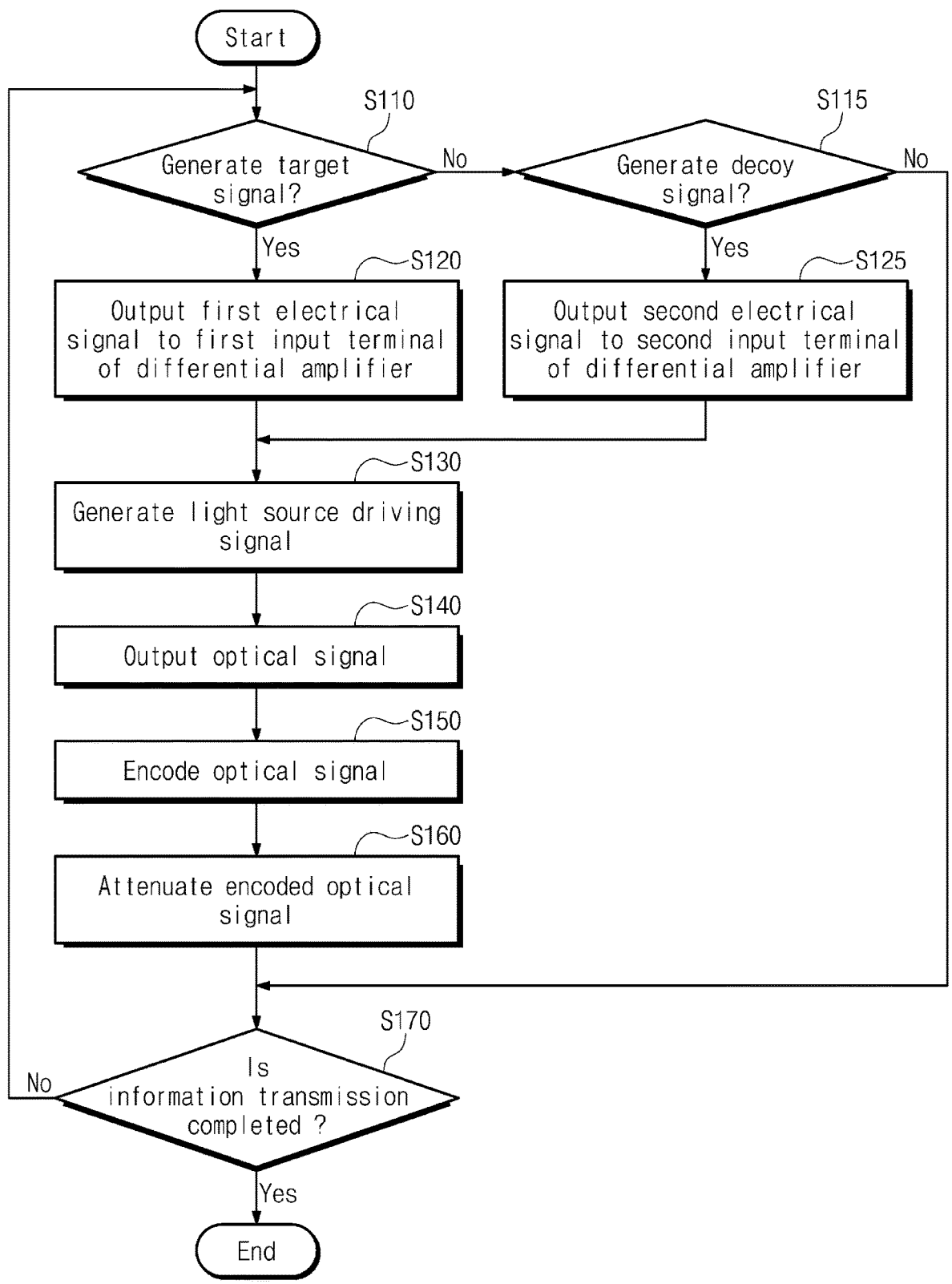
FIG. 10 is a flowchart illustrating an operating method of a quantum information transmitter of FIG. 1.

FIG. 10 is a flowchart illustrating an operating method of a quantum information transmitter of FIG. 1. Operations of FIG. 10 may be performed by the quantum information transmitter 100 described in FIGS. 1 to 9. The quantum information transmitter 100 may output the transmission information including the target signal and the decoy signal. For convenience of description, FIG. 10 will be described with reference to reference numerals in FIGS. 1 and 2.

In operation S110, the quantum information transmitter 100 determines whether to generate the target signal. When the target signal is generated, the process proceeds to operation S120. In operation S120, the signal generator 121 of the light source driver 120 may generate the first electrical signal SI corresponding to the target signal. The first electrical signal SI may be output to the first input terminal (positive input terminal) of the differential amplifier 126 of the light source driver 120. However, the present disclosure is not limited thereto, and the first electrical signal SI may be output to the second input terminal (negative input terminal) of the differential amplifier 226 as in the embodiment of FIG. 6. When the target signal is not generated, the process proceeds to operation S115.

In operation S115, the quantum information transmitter 100 determines whether to generate the decoy signal. When the decoy signal is generated, the process proceeds to operation S125. In operation S125, the signal generator 121 of the light source driver 120 may generate the second electrical signal DE corresponding to the decoy signal. The second electrical signal DE may be output to the second input terminal (negative input terminal) of the differential amplifier 126 of the light source driver 120. However, the present disclosure is not limited thereto, and the second electrical signal DE may be output to the first input terminal (positive input terminal) of the differential amplifier 226 as in the embodiment of FIG. 6. When the decoy signal is not generated, the process proceeds to operation S170, and operations S110 and S115 of determining whether a signal to be generated at subsequent timing is the target signal or the decoy signal may be performed.

In operation S130, the light source driver 120 of the quantum information transmitter 100 generates the light source driving signal LD. When the differential amplifier 126 receives the first electrical signal SI, the light source driver 120 may amplify the difference between the first electrical signal SI and the reference voltage to generate the light source driving signal LD corresponding to the target signal. When the differential amplifier 126 receives the second electrical signal DE, the light source driver 120 may amplify the difference between the reference voltage and the second electrical signal DE to generate the light source driving signal LD corresponding to the decoy signal. The level of the light source driving signal LD corresponding to the target signal and the level of the light source driving signal LD corresponding to the decoy signal may be different from each other.

In operation S140, the light source 110 of the quantum information transmitter 100 may output the light signal LS, based on the light source driving signal LD. The light source 110 may generate the light signal LS having the average number of photons depending on the level of the light source driving signal LD. Accordingly, the average number of photons of the light signal LS corresponding to the target signal and the average number of photons of the light signal LS corresponding to the decoy signal may be different from each other. However, since the light signal LS is generated from one light source 110, the physical characteristics of the light signal LS excluding the average number of photons may be identical.

In operation S150, the encoder 140 of the quantum information transmitter 100 may encode the light signal LS. The encoder 140 may generate the encoded light signal MS by applying the encryption key to the light signal LS.

In operation S160, the attenuator 150 of the quantum information transmitter 100 may attenuate the encoded light signal MS. The attenuator 150 may reduce the intensity of the encoded light signal MS such that the encoded light signal MS has the intensity required for quantum cryptographic communication. As a result of the attenuation, the transmission information TI is generated, and the transmission information TI is output to the quantum information receiver through the quantum channel. The transmission information TI may include the target signal and the decoy signal.

In operation S170, until the information transmission operation of the quantum information transmitter 100 is completed, operations S110 to S160 are repeatedly performed. According to this repetition, the target signal or the decoy signal is generated and is output through the quantum channel.

According to an embodiment of the present disclosure, components of a quantum information transmitter may be simplified by generating a decoy signal without an additional optical element and an element for driving the same.

In addition, according to an embodiment of the present disclosure, as a target signal and a decode signal are generated using single light source, the characteristics of the decoy signal may be improved and the security of quantum cryptographic communication may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum information transmitter comprising:
    a light source driver configured to generate a first light source driving signal having a first level and a second light source driving signal having a second level different from the first level;
    a light source configured to generate a first light signal having a first average number of photons in response to the first light source driving signal and to generate a second light signal having a second average number of photons different from the first average number of photons in response to the second light source driving signal; and
    an optical modulator configured to modulate the first light signal to generate a target signal, and to modulate the second light signal to generate a decoy signal,
    wherein the light source driver includes:
        a signal generator configured to generate a first electrical signal corresponding to the first light source driving signal, and a second electrical signal corresponding to the second light source driving signal; and
        a differential amplifier configured to output the first light source driving signal to the light source when the first electrical signal is received through a first input terminal, and to output the second light source driving signal to the light source when the second electrical signal is received through a second input terminal.

2. The quantum information transmitter of claim 1, wherein the first electrical signal has a level greater than a reference voltage, and the second electrical signal has a level less than the reference voltage, and
    wherein the differential amplifier amplifies a difference between the first electrical signal and the reference voltage to generate the first light source driving signal, and amplifies a difference between the reference voltage and the second electrical signal to generate the second light source driving signal.

3. The quantum information transmitter of claim 1, wherein the first electrical signal has a level less than a reference voltage, and the second electrical signal has a level greater than the reference voltage, and
    wherein the differential amplifier amplifies a difference between the reference voltage and the first electrical signal to generate the first light source driving signal, and amplifies a difference between the second electrical signal and the reference voltage to generate the second light source driving signal.

4. The quantum information transmitter of claim 1, wherein, when the first electrical signal is received, the differential amplifier outputs the first light source driving signal to the light source through an output terminal, and
wherein, when the second electrical signal is received, the differential amplifier outputs the second light source driving signal to the light source through the output terminal.

5. The quantum information transmitter of claim 1, wherein, when a first difference between the first electrical signal and a reference voltage is greater than a second difference between the second electrical signal and the reference voltage, the first average number of photons is greater than the second average number of photons, and
wherein, when the first difference is less than the second difference, the first average number of photons is less than the second average number of photons.

6. The quantum information transmitter of claim 1, wherein a wavelength of the first light signal is the same as a wavelength of the second light signal.

7. The quantum information transmitter of claim 1, wherein the optical modulator includes:
an encoder configured to encode the first light signal and the second light signal by applying an encryption key to the first light signal and the second light signal, respectively; and
an attenuator configured to generate the target signal by reducing an intensity of the encoded first light signal and to generate the decoy signal by reducing an intensity of the encoded second light signal.

8. The quantum information transmitter of claim 1, wherein, when the first level is greater than the second level, the first average number of photons is greater than the second average number of photons, an average number of photons of the target signal is less than the first average number of photons, and an average number of photons of the decoy signal is less than the average number of photons of the target signal and the second average number of photons, and
wherein, when the first level is less than the second level, the first average number of photons is less than the second average number of photons, the average number of photons of the decoy signal is less than the second average number of photons, and the average number of photons of the target signal is less than the average number of photons of the decoy signal and the first average number of photons.

9. A quantum information transmitter comprising:
a light source driver configured to generate a first light source driving signal having a first level and a second light source driving signal having a second level different from the first level;
a light source configured to generate a first light signal having a first average number of photons in response to the first light source driving signal and to generate a second light signal having a second average number of photons different from the first average number of photons in response to the second light source driving signal; and
an optical modulator configured to modulate the first light signal to generate a target signal, and to modulate the second light signal to generate a decoy signal,
wherein the light source driver includes:
a first signal generator configured to generate a first electrical signal corresponding to the first light source driving signal, and to output the first electrical signal to its first and second output lines;
a second signal generator configured to generate a second electrical signal corresponding to the second light source driving signal, and to output the second electrical signal to its first and second output lines;
a differential amplifier configured to amplify the first electrical signal received through a first input terminal and a second input terminal to generate the first light source driving signal, and to amplify the second electrical signal received through the first input terminal and the second input terminal to generate the second light source driving signal; and
a combiner configured to electrically connect the first and second output lines of the first signal generator to the first and second input terminals of the differential amplifier, respectively, when the first electrical signal is received, and to electrically connect the first and second output lines of the second signal generator to the first and second input terminals of the differential amplifier, respectively, when the second electrical signal is received.

10. A quantum information transmitter comprising:
a light source driver configured to generate a first light source driving signal having a first level and a second light source driving signal having a second level different from the first level;
a light source configured to generate a first light signal having a first average number of photons in response to the first light source driving signal and to generate a second light signal having a second average number of photons different from the first average number of photons in response to the second light source driving signal; and
an optical modulator configured to modulate the first light signal to generate a target signal, and to modulate the second light signal to generate a decoy signal,
wherein the light source driver includes:
a first signal generator configured to generate a first electrical signal corresponding to the first light source driving signal, and to output the first electrical signal to its first and second output lines;
a second signal generator configured to generate a second electrical signal corresponding to the second light source driving signal, and to output the second electrical signal to its first and second output lines;
a first differential amplifier configured to amplify the first electrical signal received through the first and second output lines of the first signal generator to generate the first light source driving signal;
a second differential amplifier configured to amplify the second electrical signal received through the first and second output lines of the second signal generator to generate the second light source driving signal; and
a combiner configured to transfer the first light source driving signal and the second light source driving signal to the light source.

11. A quantum communication system comprising:
a quantum information transmitter including;
a light source driver configured to output a first light source driving signal having a first level to the light source, and to output a second light source driving signal having a second level different from the first level to the light source;

a light source configured to generate a first light signal having a first average number of photons based on the first level of the first light source driving signal, and a second light signal having a second average number of photons different from the first average number of photons based on the second level of the second light source driving signal; and an optical modulator configured to generate a target signal, based on the first light signal and to generate a decoy signal, based on the second light signal; and a quantum information receiver configured to receive the target signal and the decoy signal from the quantum information transmitter through a quantum channel, wherein the light source driver includes:

a signal generator configured to generate a first electrical signal and a second electrical signal having a level different from the first electrical signal; and a differential amplifier configured to generate the first light source driving signal, based on a difference between the first electrical signal and a reference voltage, and to generate the second light source driving signal, based on a difference between the second electrical signal and the reference voltage, and wherein the signal generator outputs the first electrical signal to a first input terminal of the differential amplifier, and outputs the second electrical signal to a second input terminal of the differential amplifier.

12. The quantum communication system of claim 11, wherein the decoy signal includes a first decoy having an average number of photons greater than '0', and a second decoy having an average number of photons of '0', and wherein the light source generates the second light signal corresponding to the first decoy when the second level is greater than a reference voltage, and generates the second light signal corresponding to the second decoy when the second level is the reference voltage.

13. The quantum communication system of claim 11, wherein the optical modulator generates the target signal having a third average number of photons less than the first average number of photons by reducing an intensity of the first light signal, and generates the decoy signal having a fourth average number of photons that is less than the second average number of photons and different from the third average number of photons by reducing an intensity of the second light signal, and wherein the optical modulator reduces the intensity of the first light signal and the intensity of the second light signal under the same attenuation condition.

14. The quantum communication system of claim 11, wherein the quantum information receiver determines a photon number splitting attack, based on an average number of photons of the received target signal and an average number of photons of the received decoy signal.

15. An operating method of a quantum information transmitter comprising:

outputting a first electrical signal to a first input terminal of a differential amplifier;

outputting a second electrical signal to a second input terminal of the differential amplifier;

generating a first light source driving signal having a first level by amplifying a difference between the first electrical signal and a reference voltage;

generating a second light source driving signal having a second level by amplifying a difference between the second electrical signal and the reference voltage;

generating a first light signal, based on the first light source driving signal;

generating a second light signal having an average number of photons different from that of the first light signal, based on the second light source driving signal;

generating a target signal by modulating the first light signal; and generating a decoy signal having an average number of photons different from that of the target signal by modulating the second light signal.

16. The operating method of claim 15, wherein the first electrical signal has a voltage level greater than the reference voltage, and the second electrical signal has a voltage level less than the reference voltage.

17. The operating method of claim 15, wherein the first electrical signal has a voltage level less than the reference voltage, and the second electrical signal has a voltage level greater than the reference voltage.

* * * * *